United States Patent [19]
Yamaura et al.

[11] 3,856,926
[45] Dec. 24, 1974

[54] PROCESS FOR PREPARING CARBON PASTE

[75] Inventors: Tokuharu Yamaura, Tokyo; Masayuki Takeda, Ohmachi; Koi Tajima, Ohmachi; Norio Koike, Ohmachi, all of Japan

[73] Assignee: Showa Denko Kabushiki Kaisha, Tokyo, Japan

[22] Filed: June 15, 1972

[21] Appl. No.: 263,120

Related U.S. Application Data

[63] Continuation-in-part of Ser. No. 873,401, Nov. 3, 1969, abandoned.

[30] Foreign Application Priority Data
Nov. 6, 1968  Japan.............................. 43-80627

[52] U.S. Cl................. 423/448, 423/449, 264/29, 259/194, 106/284
[51] Int. Cl............................................ C01b 31/04
[58] Field of Search ............. 423/448, 449; 264/29; 259/185, 194, DIG. 2; 106/284

[56] References Cited
UNITED STATES PATENTS
3,254,143   5/1966   Heitman .............................. 264/29

OTHER PUBLICATIONS
Kirk–Othmer Encyclopedia of Chemical Technology, 2nd Ed., Vol. 4, 1964, pages 163–167, 172, & 173.
Kirk-Othmer Encyclopedia of Chemical Technology, 2nd Ed., Vol. 13, 1967, pages 601–612.

*Primary Examiner*—Herbert T. Carter
*Attorney, Agent, or Firm*—Ernest G. Montague; Karl F. Ross; Herbert Dubno

[57] ABSTRACT

Carbon paste is produced by kneading a filler such as coke and a binder such as tar or pitch under mechanically pressurized conditions. The resulting carbon paste has excellent properties and is used for industrial carbon products such as artificial-graphite electrodes, Sodeberg electrodes, carbon blocks, carbon bricks and the like.

1 Claim, 5 Drawing Figures

PROCESS FOR PREPARING CARBON PASTE

REFERENCE TO RELATED APPLICATION

This is a continuation-in-part of our copending application Ser. No. 873,401 filed Nov. 3, 1969, now abandoned.

This invention relates to a process for preparing carbon paste. More particularly, this invention relates to a process for preparing carbon paste for use in the fabrication of industrial carbon products such as artificial graphite electrodes, Soderberg electrodes, carbon blocks, carbon bricks and the like.

Heretofore, the carbon products have been prepared by kneading a filler such as coke and a binder such as tar, pitch and the like by means of a non pressurized type of kneader to produce a carbon paste which is thereafter molded, baked and, if necessary, graphitized.

Although the quality and the property of the carbon products prepared as above depends fully on the quality of the carbon paste from which said products are prepared, it has been considered very difficult to improve the kneading step for the carbon paste because of unique properties of the carbon paste.

In the kneading step, there are a number of points to be improved; for example, high viscosity of the pitch makes it difficult to "moisten" the coke powder with pitch and, hence, difficult to blend the coke powder and pitch intimately, and a relatively long period of time is required in the kneading step for producing a carbon paste having kneaded characteristics suitable for the molding.

The primary object of this invention is to provide a process for easily preparing a carbon paste having excellent properties and suitable for producing various carbon products.

Another object of this invention is to provide a process for preparing the carbon paste in which the time required for the kneading of a binder and the filler is remarkably reduced.

Still another object of this invention is to provide a process for preparing a paste to be used for obtaining graphitized products having a low thermal-expansion coefficient.

A further object of this invention is to provide a process for preparing a carbon paste in which the amount of binder to be added is reduced. As reduction of the amount of pitch or tar results in greater carbonization thereof, a carbon paste of high quality suitable for producing various carbon products can be obtained.

Yet another object of this invention is to provide a process for preparing baked carbon by using this pressured and intimately blended carbon paste. It is also an object of this invention to provide a process for producing graphitized carbon products by using the aforesaid baked carbon.

Further objects and other features of this invention will be explained hereinafter in detail by referring to the appended drawings.

As the result of extended research made by the present inventors, it has been found that an excellent carbon paste can be produced by kneading an filler of coke and a binder such as tar and pitch under mechanically pressurized conditions.

Figure 1:
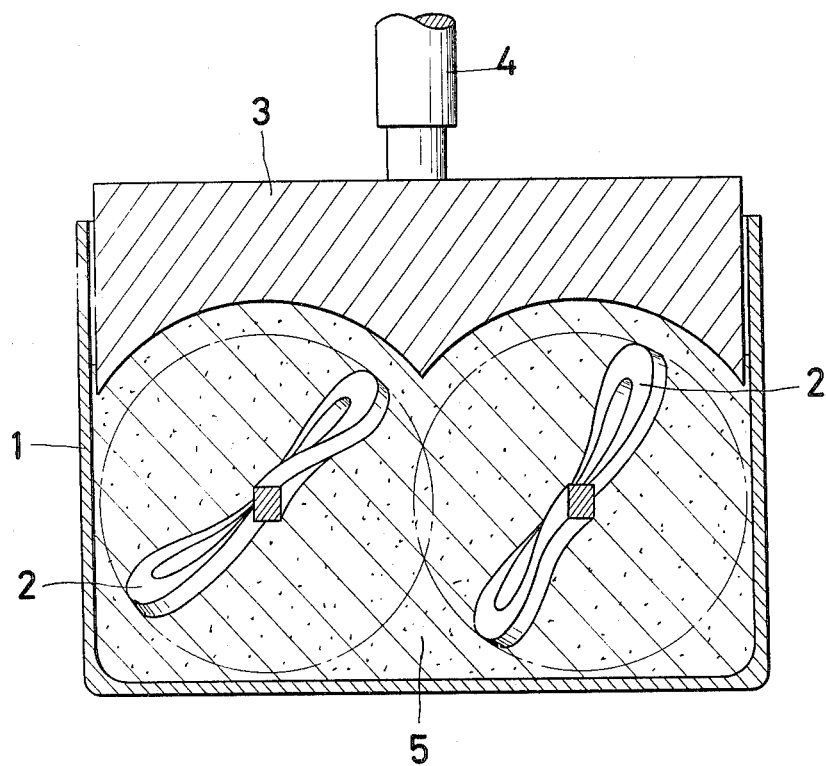
FIG. 1 is a vertical-sectional side view of an example of the mechanical pressure-type kneader employed to carry out the process of this invention.

In an embodiment of the procedure which provides a mechanical pressure to the mixture of a filler and a binder, the mixture is kneaded under mechanical pressure in the conventional type kneader equipped with a pressure plate according to the invention, while applying pressure to the plate by an appropriate means, for example, by pressurized air or oil, as shown in FIG. 1.

In FIG. 1, pressure plate 3 is provided at the top of the conventional type kneader having inside thereof two Σ or Z shaped rotating wings 2 (rotors). Said pressure plate 3 is freely slidable in contact with the inside wall of the upper portion of the kneader and is mounted so as to make it possible to set the plate at a given position. The upper side 4 of the plate 3 is connected to a mechanically pressurizing means such as pressurized air, oil or the like, and the mixture 5 in the kneader is kneaded by means of the two rotating wings 2 while keeping the mixture under an appropriately pressurized condition. Optionally, a kneader equipped with heating means for heating the mixture may be used in the process of this invention.

In the apparatus shown in FIG. 1, the plate 3 is movable. Similar effects can be achieved also by using an apparatus in which the bottom plate or a side plate is movable.

In this manner, an excellent carbon paste can be obtained by kneading the coke and the binder under mechanically pressurized conditions in a short period of time, i.e., approximately one-third to one-half of the time required for the conventional technique effected by nonpressurized kneading. This is due to the fact that in the process of this invention the kneading is always effected under strong shearing power and compression.

The preferred pressure applied mechanically is in the range of from 0.2 to 1.0 kg/cm$^2$. Pressure below 0.2 kg/cm$^2$ is not effective and pressure above 1.0 kg/cm$^2$ results in the pulverization of the filler and sometimes does not produce carbon paste having the desired grain.

In applying the mechanical pressure to the kneader the pressure may be applied from the beginning of the kneading or the kneading may be initiated under non-pressurized condition and, after removal of low-boiling point substances and steam, may be effected under pressure.

In contrast, it is possible to effect the kneading under mechanical pressure at the earlier stage of the kneading and thereafter under non-pressurized conditions. In particular when filler powder which is difficult to blend with a binder is used, the mixture can be kneaded first under mechanical pressure followed by the addition of filler grains and then kneaded under either non-pressurized or pressurized conditions.

When the filler and the binder are kneaded under pressure, a film coating of the binder is formed on the surface of the filler particles, said film being thiner than that obtained by kneading under nonpressurized conditions. This makes it possible to attain the desired coating with a smaller amount of the binder and, therefore, to increase the percent carbonization of the binder upon baking of the resulting carbon paste since the loss of the binder due to flowing out is prevented. In other words, the binder is effectively utilized for the coating of the filler particles thereby resulting in the improved filling properties of the filler, and thus carbon products having excellent properties are produced by the process of this invention.

Further, the graphitized product obtained by graphitizing the paste which is pressured and intimately blended according to the method of this invention has an advantage that it has a lower thermal expansion coefficient than the graphitized product prepared from the paste which is blended without pressure. This fact indicates that this graphitized product is conspicuously improved in resistance to heat shock.

In accordance with the kneading process of this invention, an excellent dispersion effect is obtained even when a hard pitch having a high softening point is used, and a carbon paste which is uniform in all respects can easily be obtained.

The amount of binder present in the mixture of a coke and a binder is required to exceed 19% but not exceed 28% by weight. The carbon paste formed cannot be molded sufficiently when the amount of binder falls short of 19% by weight. It is too soft to be molded when the amount of binder exceeds 28% by weight. The duration of blending is required to be in the range of from 5 to 60 minutes. The blending fails to produce the effect aimed at when the duration falls short of 5 minutes. The pitch is deteriorated or the particles are disintegrated to the extent of degrading the properties of the paste when the duration exceeds 60 minutes. As the binder, there may be used tar pitch derived from either petroleum or coal. Depending on the kind of carbon product aimed at, tar pitch having a desired softening point (determined by the ring and ball method; the same applies hereinafter) in the range of from 70°C to 150°C may be used.

Generally in producing a paste in the absence of pressure, use of hard pitch (pitch having a high softening point) renders the blending difficult. Application of pressure is quite effective, because it renders the blending easy even if hard pitch is used.

Though the temperature at which the blending is performed is variable with the kind of pitch, it is required to fall in the range whose lower limit is 20°C and whose upper limit is 60°C in excess of the softening point of the pitch being used. Inferior wetting results when the blending temperature fails to reach the said lower limit of the range. Low boiling components present in the pitch are volatilized to the extent of impairing the property of pitch as binder when the blending temperature exceeds the said upper limit of the range. This invention further embraces the manufacture of baked carbon having excellent properties from the aforementioned carbon paste and also the manufacture of graphitized products from this baked carbon.

Baked carbon possessed of outstanding physical properties is obtained by baking at 800°C to 1300°C the carbon paste prepared by the aforesaid method. Graphitized products manifesting excellent physical properties can be obtained by heating the baked carbon further to 2500°C – 3400°C.

The process of this invention is further illustrated by the following examples but is not limited thereto.

EXAMPLE 1

Into a kneader having an effective kneading volume of 100l and equipped with a mechanical pressuring means were charged 2 to 20 mesh (ASTM) coke grain and coke powder in the proportion of 1:1.

The kneader was then charged with coal tar pitch having a softening point of 84°C and a binder, the latter being in an amount such that the pitch had a final content of 20% based on the total amount of the mixture. The contents of the kneader were kneaded at about 130°C under pressure for 60 minutes to yield carbon paste.

Figure 2:
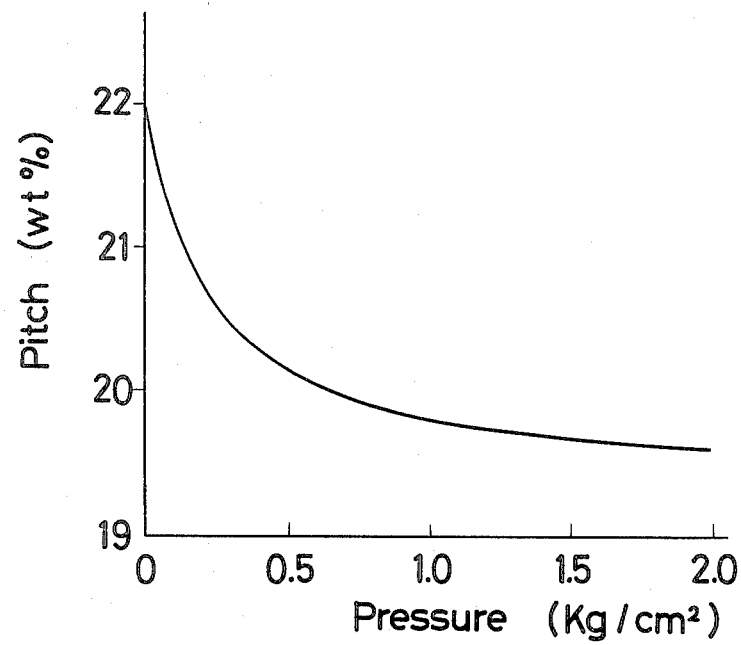
FIG. 2 is a graph showing the relationship between the percent addition of pitch as a binder and the pressure applied in the process of this invention.

In order to prepare paste more suited to extrusion molding under a particular pressure, for example, the relationship between the pressure applied and the percent addition of pitch used in the above process were as shown in FIG. 2. It is clear from FIG. 2 that, in order to obtain the carbon paste used for extruding molding under the constant pressure of 50kg/cm$^2$, the percent addition of pitch can be reduced by more than 1 and 2%, respectively, when the pressures of 0.2 kg/cm$^2$ and 0.5 kg/cm$^2$ are used in the kneading process, as compared with that required for obtaining the paste by the non-pressurized kneading.

Figure 3:
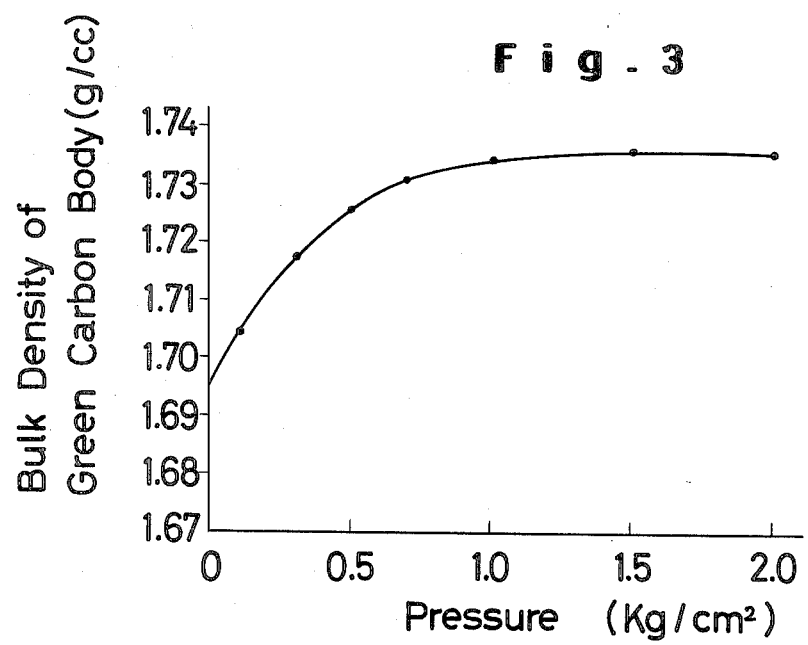
FIG. 3 is a graph showing the relationship between the bulk density of green carbon body and the pressure applied in the process of this invention.

The relationship between the bulk density of the thus produced green carbon body and the pressure applied in the kneading process is shown in FIG. 3. It is clearly understood from FIG. 3 that the nonpressurized kneading results in the bulk density of 1.695, whereas the kneading under the pressure of 0.5 kg/cm$^2$ improves the bulk density sharply to 1.725 with a gradual increase in bulk density thereafter.

EXAMPLE 2

To the mixture of cokes having the same proportion as that used in Example 1 was added pitch (softening point 84°C) at the ratios shown in FIG. 2 according to the pressure applied. The resulting mixture was then kneaded at a temperature of about 130°C for a period of 30 minutes under non-pressurized condition and thereafter kneaded for an additional 30 minutes under nonpressurized condition and under the pressures of 0.1, 0.3, 0.5, 0.7, 1.0, 1.5 and 2.0 kg/cm$^2$, respectively. Each of the resulting carbon pastes was then extruded under the same pressure in each instance to mold the paste into a rod having dimensions of 9 cm diameter and 100 cm length, and the rod was then baked at a temperature of 1000°C and then graphitized at a temperature of 2800°C to obtain a graphitized carbon product.

Figure 4:
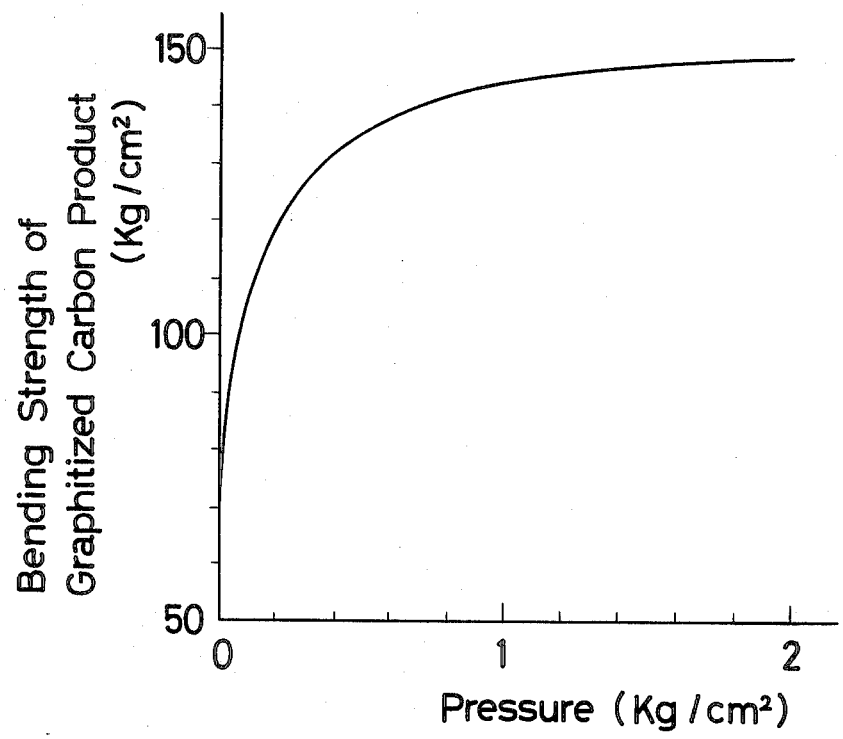
FIG. 4 is a graph showing the relationship between the bending strength of the graphitized carbon product prepared by the process of this invention and the pressure applied in the process.

A test piece of the graphitized carbon product 2 cm diameter and 10 cm length was cut out from each of the graphitized carbon products obtained as above and measured for the bending strength by means of the Amslar testing machine. The results obtained were as shown in FIG. 4. It is clear from FIG. 4 that the bending strength is remarkably increased in the pressure range of from 0 to 0.5 kg/cm$^2$, whereas it is slowly increased at pressures about 0.5 kg/cm², indicating that the preferred pressure range for the kneading is between 0.2 and 1.0 kg/cm².

EXAMPLE 3

The carbon paste obtained in Example 2 by the nonpressurized method and that obtained in Example 2 by the method employing 0.5 kg/cm² were respectively molded under the same conditions into rods having dimensions of 9 cm diameter and 100 cm length and each of the rods thus obtained was heat-treated at a temperature in the range of from 1000°C to 1200°C to produce a baked carbon product. The bulk density of the resulting baked carbon product was as shown in Table 1.

TABLE 1

|  | Baked Carbon Product prepared from the pressure kneaded carbon paste | Baked Carbon Product prepared from the nonpressure kneaded carbon paste |
|---|---|---|
| Bulk Density g/cc | 1.63 | 1.55 |

From the above table, it is clear that the baked carbon product from the carbon paste prepared by the mechanically pressurized kneading has a density higher than that of the baked carbon product from the carbon paste prepared by the nonpressurized kneading.

EXAMPLE 4

A test piece having dimensions of 2.5cm × 2.5cm and 15 cm length was cut out from each of the baked carbon products obtained in Example 3 and was then graphitized at a temperature of 2800°C. The properties of each graphitized carbon product were as shown in Table 2 below.

In the determination of the loss due to oxidation, air was supplied at a rate of 5 l/minute at 600°C for 120 minutes.

It was confirmed from the above results that the graphitized carbon product from the carbon paste prepared by mechanically pressurized kneading shows improved properties as compared with those of the graphitized carbon product from the carbon paste prepared by nonpressurized kneading.

Each of the above graphitized carbon products was then cut into pieces each of 2 mm thickness and subjected to X-ray radiographic inspection to examine the structure of the graphitized carbon product. It was found that the graphitized carbon product from the carbon paste prepared by the mechanically pressurized kneading has almost no hair crack and has a good texture, whereas the graphitized carbon product from the carbon paste prepared by the nonpressurized kneading shows the presence of a number of white hair cracks.

EXAMPLE 5

Each of the backed carbon products obtained in Example 3 was subjected once to pitch impregnation treatment in accordance with the conventional method. The pitch used for the above treatment has a softening point of 80°C as measured by the R & B method. The carbon products thus treated and untreated carbon products were then graphitized at a temperature of about 2800°C, and the resulting graphitized carbon products were then examined for their pore structure. The results obtained were as shown in FIG. 5.

Figure 5:
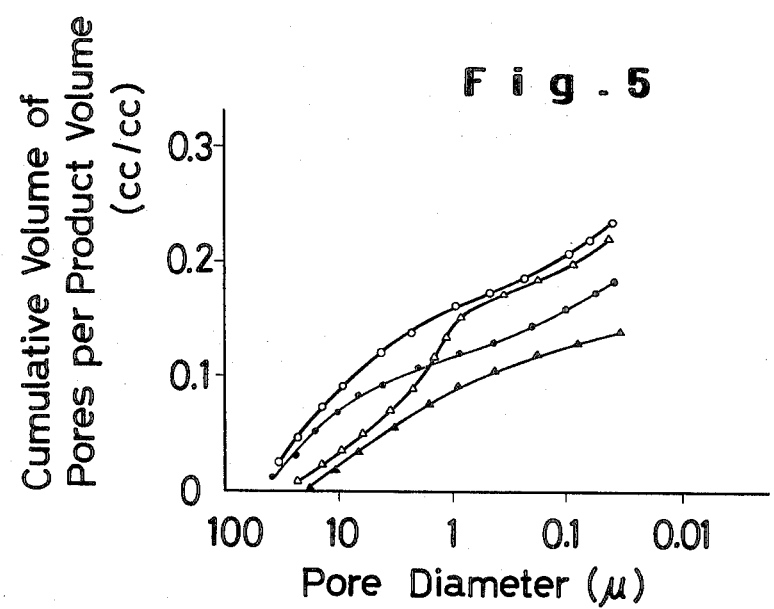
FIG. 5 is a graph showing the relationship between the pore diameter and the cumulative pores of products prepared by the process of this invention and of those prepared by conventional means.

In FIG. 5, the pore diameter is plotted to the logarithmic scale on the abscissa and the ratio of the cumulative volume of all pores of more than a given diameter to volume of product is plotted on the ordinate, and the mark "O" denotes the graphitized carbon product from the carbon paste prepared by the nonpressurized kneading and without the pitch impregnation treatment; the mark "●" denotes the graphitized carbon product from the same carbon paste as above but with pitch impregnation treatment; the mark "Δ" denotes the graphitized carbon product from the carbon paste prepared by pressurized kneading and without the pitch treatment; and the mark "▲" denotes the graphitized carbon product from the same carbon paste but with the pitch impregnation treatment.

It is clear from FIG. 5 that the graphitized carbon product from the carbon paste prepared by the mechanically pressurized kneading shows a small amount of pores of more than 10 $\mu$ in diameter and a large amount of pores of a diameter of 1 to 10 $\mu$. It is also understood, from the change in pore structure before and after pitch impregnation treatment, that the pores which are filled with the pitch in the pitch impregnation treatment are mainly those having a diameter of 1 to 10 $\mu$. This indicates that the graphitized carbon product from the carbon paste prepared by the pressurized kneading provides an excellent material for use with the pitch impregnation treatment.

EXAMPLE 6

Test pieces having dimensions of 2.5cm × 2.5cm and 15 cm length were cut out from each of the baked carbon products obtained in Example 3 and were mea-

TABLE 2

|  | Bulk Density g/cc | Bending Strength kg/cm² | Young Modulus kg/mm² | Specific Resistance × 10⁻⁵Ωcm | Loss due to Oxidation % |
|---|---|---|---|---|---|
| Graphitized Carbon Body prepared from the pressure kneaded carbon paste | 1.61 | 135 | 900 | 71 | 11 |
| Graphitized Carbon Body prepared from the nonpressure kneaded carbon paste | 1.53 | 70 | 550 | 97 | 15 | sured for their properties after they were graphitized with or without previous pitch impregnation treatment, (0, 1, 2 or 3 impregnation treatments). The results obtained were as shown in Table 3.

TABLE 3

(Test piece: 2 cm $\phi \times$ 10 cm)

| Frequency of Impregnation | Graphitized Carbon Product from the carbon paste prepared by pressurized kneading (0.5 kg/cm²) | | | Graphitized Carbon Product from the carbon paste prepared by nonpressurized kneading | | | |
|---|---|---|---|---|---|---|---|
| | 0 | 1 | 2 | 0 | 1 | 2 | 3 |
| Bulk Density g/cc | 1.61 | 1.73 | 1.79 | 1.53 | 1.59 | 1.62 | 1.65 |
| Bending Strength (kg/cm²) | 135 | 205 | 240 | 70 | 110 | 150 | 180 |
| Yound Modulus (kg/mm²) | 900 | 1290 | 1450 | 550 | 780 | 950 | 1150 |
| Specific Resistance ($\times 10^{-5} \Omega \cdot$cm) | 71 | 57 | 49 | 97 | 73 | 62 | 58 |

It is observed from the above table that the graphitized carbon product from the carbon paste prepared by mechanically pressurized kneading followed by one impregnation treatment has extremely superior properties as compared with those of the graphitized carbon product from the carbon paste prepared by the nonpressurized kneading followed by three impregnation treatments.

EXAMPLE 7

A kneader having an available kneading volume of 100$l$ and provided with a mechanical pressuring means was charged with 2 to 20 mesh (ASTM) coke grains and coke powder in the proportion of 1:1. Further, the kneader was charged with coal tar pitch having a softening point of 105°C in an amount such that the tar pitch constituted 23% of the total amount of mixture. The contents of the kneader was blended at about 160°C under pressure of 0.5 kg/cm² for 35 minutes to afford carbon paste.

A graphitized carbon body was produced by graphitizing this carbon paste at about 2800°C. The properties of this graphitized material are shown in Table 4.

TABLE 4

| Bulk Density g/cc | 1.63 |
| Bending Strength kg/cm² | 162 |
| Young Modulus kg/mm² | 1119 |
| Specific Resistance $\times 10^{-5} \Omega \cdot$cm | 68 |
| Loss due to Oxidation % | * 10 |

* Conditions for determination of oxidation loss - 600°C, 120 minutes, air at flow volume of 5 $l$/min

EXAMPLE 8

A kneader having an available kneading volume of 3200$l$ and provided with a mechanical pressuring means was charged with 2 to 20 mesh (ASTM) coke grains and coke powder in a proportion of 1:1. The kneader was further charged with coal tar pitch having a softening point of 84°C in an amount such that the coal tar pitch constituted 22% of the total amount of mixture. The contents of the kneader was blended at about 140°C without pressure for 30 minutes and subsequently under a pressure of 0.5 kg/cm² for 5 minutes.

The carbon paste thus prepared was molded into a rod of the shape of an electrode. The rod was fired at 1000°C and then graphitized at 3000°C.

Test pieces 2 cm in diameter and 10 cm in length were cut from the graphitized product and tested for properties.

Separately, another graphitized electrode was obtained by following the procedure mentioned above, except that the preliminary step for blending was carried out for 35 minutes in the absence of pressure. Test pieces were cut from this electrode and similarly tested for physical properties. The values of physical properties thus determined are compared in Table 5.

TABLE 5

| | Apparent density (g/cc) | Specific resistance ($10^{-5} \Omega \cdot$cm) | Modulus of elasticity (kg/mm²) | Flexural strength (kg/cm²) |
|---|---|---|---|---|
| Pressured product | 1.63 | 62 | 1010 | 120 |
| Unpressured product | 1.59 | 67 | 900 | 95 |

EXAMPLE 9

A kneader having an available kneading volume of 10$l$ and provided with a mechanical pressuring means was charged with 10 to 20 mesh (ASTM) coke grains and coke powder in a proportion of 20:80. The kneader was further charged with coal tar pitch having a softening point of 105°C in an amount such that the tar pitch constituted 22% of the total amount of mixture. The contents of the kneader were blended at about 135°C for different lengths of time under different magnitudes of pressure both indicated hereinafter.

The carbon pastes of different batches thus prepared were molded into rods of the shape of electrodes 1 inch in diameter and 25 inches in length. These rods were graphitized at 2800°C into electrodes.

Test pieces 8 mm in diameter and 80 mm in length were cut out from the graphitized products and tested for thermal expansion coefficient (average between 500°C and 800°C) in the direction of length.

Separately, graphitized electrodes were prepared by following the same procedure as mentioned above, except that the preliminary step for blending of carbon paste was performed in the absence of pressure. Test pieces were cut from these products and similarly tested for thermal expansion coefficient. The results are shown in Table 6.

TABLE 6

| Pressure applied during blending of carbon paste kg/cm² | Duration of pressure application min | Thermal expansion coefficient $\times 10^{-6} °C^{-1}$ |
|---|---|---|
| 0.3 | 30 | 2.14 |
| 0.3 | 60 | 1.98 |
| 0.5 | 60 | 1.84 |
| 1.0 | 30 | 1.85 |
| 1.0 | 60 | 1.86 |
| 0 | | 2.30 |

From the preceding table, it is seen that the thermal expansion coefficient was lower for the graphitized product manufactured from the carbon paste prepared under pressure than for the graphitized product manufactured from the carbon paste prepared in the absence of pressure.

We claim:

1. In a method for producing a carbon body in which a carbon paste is kneaded in a kneader having a Σ or Z shaped rotating wing, the improvement in which:
   a. mechanical pressure of 0.2 to 1.0 kg/cm² is applied to the carbon paste in said kneader during the kneading by pressing a plate thereagainst;
   b. the binder constitutes 19 to 28% of said paste;
   c. the paste is kneaded for a period of 5 to 60 minutes;
   d. the paste is kneaded at a temperature between 20°C and 60°C above the softening point of the binder;
   e. the kneaded paste is shaped and baked at a temperature of 800° to 1300°C; and
   f. the shaped baked paste is graphitized at a temperature between 2500° and 3400°C to yield said body.

* * * * *